United States Patent

Tsuyuzaki (10) Patent No.: US 9,524,544 B2
(45) Date of Patent: Dec. 20, 2016

(54) INFORMATION PROCESSING APPARATUS, INFORMATION PROCESSING METHOD, AND NON-TRANSITORY COMPUTER READABLE MEDIUM

(71) Applicant: FUJI XEROX CO., LTD, Minato-ku, Tokyo (JP)

(72) Inventor: Norihiko Tsuyuzaki, Kanagawa (JP)

(73) Assignee: FUJI XEROX CO., LTD, Tokyo (JP)

( * ) Notice: Subject to any disclaimer, the term of this patent is extended or adjusted under 35 U.S.C. 154(b) by 0 days.

(21) Appl. No.: 14/289,091

(22) Filed: May 28, 2014

(65) Prior Publication Data

US 2015/0023605 A1    Jan. 22, 2015

(30) Foreign Application Priority Data

Jul. 19, 2013 (JP) ................................ 2013-150404

(51) Int. Cl.
*G06T 7/00* (2006.01)

(52) U.S. Cl.
CPC ..... *G06T 7/001* (2013.01); *G06T 2207/30176* (2013.01)

(58) Field of Classification Search
CPC .............. G06K 9/6202; G06K 9/00463; G06K 9/00483

See application file for complete search history.

(56) References Cited

U.S. PATENT DOCUMENTS

| | | |
|---|---|---|
| 2002/0002567 A1 | 1/2002 | Kanie et al. |
| 2007/0092124 A1* | 4/2007 | Moriya .......................... 382/128 |
| 2007/0120844 A1* | 5/2007 | Beikirch .............. G06K 9/4604 345/419 |
| 2009/0049016 A1 | 2/2009 | Sakamoto |
| 2014/0376792 A1* | 12/2014 | Matsuzaki et al. ........... 382/128 |
| 2015/0022698 A1* | 1/2015 | Na et al. ........................ 348/241 |

FOREIGN PATENT DOCUMENTS

| | | |
|---|---|---|
| JP | 2001-283231 A | 10/2001 |
| JP | 2002-24211 A | 1/2002 |
| JP | 2006-178270 A | 7/2006 |
| JP | 2008-257510 A | 10/2008 |
| JP | 2009-48377 A | 3/2009 |

OTHER PUBLICATIONS

Communication dated Jul. 26, 2016 from the Japanese Patent Office in counterpart application No. 2013-150404.
Japanese Office Action (Decision of Refusal) dated Oct. 25, 2016, for Japanese Patent Application 2013-150404.

* cited by examiner

*Primary Examiner* — Edward Park
(74) *Attorney, Agent, or Firm* — Sughrue Mion, PLLC (57) ABSTRACT

An information processing apparatus includes a comparing target image acquisition unit that acquires a comparing target image that is to be compared with an original image, a difference detection unit that detects one or more difference information items by comparing the original image and the comparing target image, and an original image updating unit that updates the original image by reflecting a difference information item that is selected by a user among the difference information items, which are detected.

10 Claims, 4 Drawing Sheets

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-150404 filed Jul. 19, 2013.

BACKGROUND

Technical Field

The present invention relates to an information processing apparatus, an information processing method, and a non-transitory computer readable medium.

SUMMARY

According to an aspect of the invention, there is provided an information processing apparatus including a comparing target image acquisition unit that acquires a comparing target image that is to be compared with an original image, a difference detection unit that detects one or more difference information items by comparing the original image and the comparing target image, and an original image updating unit that updates the original image by reflecting a difference information item that is selected by a user among the difference information items, which are detected.

BRIEF DESCRIPTION OF THE DRAWINGS

An exemplary embodiment of the present invention will be described in detail based on the following figures, wherein.

DETAILED DESCRIPTION

An exemplary embodiment of the present invention will be described in detail below with reference to the drawings.

Figure 1:
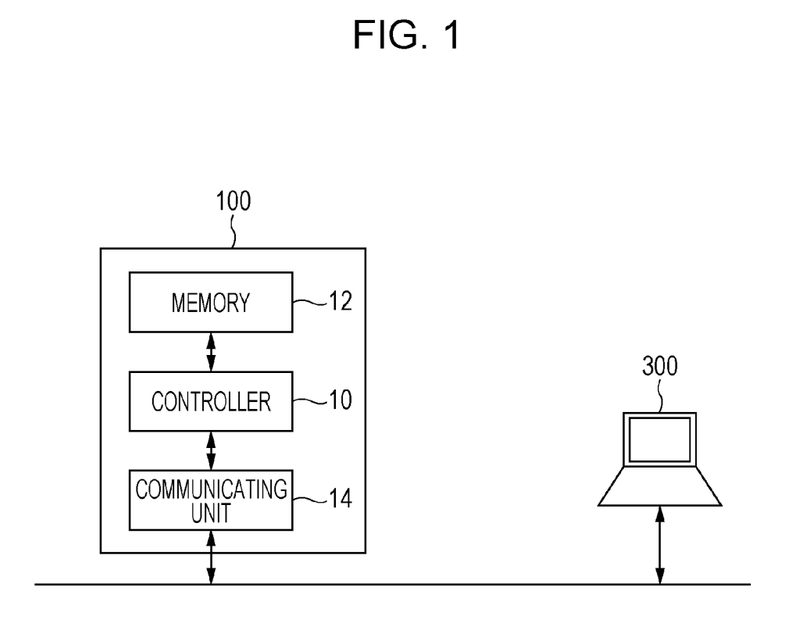
FIG. 1 is a diagram illustrating an example of the configuration of an information processing apparatus 100 according to the exemplary embodiment.

FIG. 1 is a diagram illustrating an example of the configuration of an information processing apparatus 100 according to the exemplary embodiment. As illustrated in FIG. 1, the information processing apparatus 100 according to the exemplary embodiment is connected to a terminal 300 via a communication unit such as a local area network (LAN) or the Internet.

The information processing apparatus 100 is, for example, a computer such as a server and includes a controller 10 that is a program control device such as a CPU that operates in accordance with a program that is installed in the information processing apparatus 100, a memory 12 that is, for example, a memory element such as a ROM or a RAM or a hard disk drive, a communicating unit 14 that is a communication interface such as a network board, and the like.

The terminal 300 is, for example, a computer such as a personal computer and includes a controller that is a program control device such as a CPU that operates in accordance with a program that is installed in the terminal 300, a memory that is, for example, a memory element such as a ROM or a RAM or a hard disk drive, a communicating unit that is a communication interface such as a network board, a display unit such as a display, and operation units such as a mouse, a keyboard, and a button.

Figure 2:
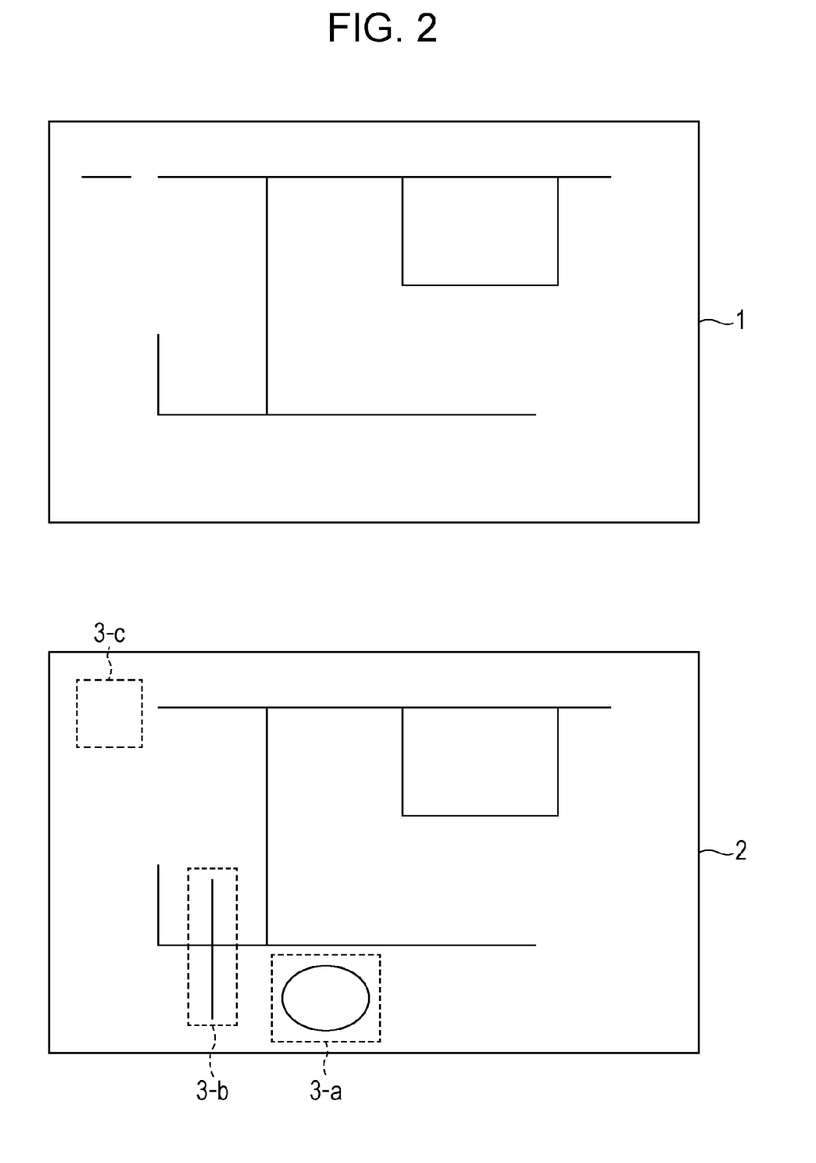
FIG. 2 is a diagram illustrating examples of difference information items according to the exemplary embodiment.

One of the processes that are performed by the information processing apparatus 100 is a difference detection process in which a comparing target image 2 that is generated in the terminal 300 by an image editing operation that is performed by a user is acquired, and difference information items, which are information items of differences between the comparing target image 2 and an original image 1, are detected (see FIG. 2). FIG. 2 is a diagram illustrating examples of difference information items according to the exemplary embodiment. As illustrated in FIG. 2, the comparing target image 2, which is generated in the terminal 300, includes multiple components, and examples of the comparing target image 2 are a machine diagram, a circuit diagram, and the like. The comparing target image 2 is generated by the image editing operation, which is performed by a user, the image editing operation including adding a new component to the original image 1, which includes multiple components, (the original image 1 may be an image of a blank sheet) and correcting and deleting a component. In the exemplary embodiment, the original image 1, which is an image of a blank sheet or an image that includes multiple components, is stored in the memory of the terminal 300. The terminal 300 edits the original image 1, which is stored in the memory of the terminal 300, in accordance with the image editing operation, which is performed by a user, and generates the comparing target image 2 that is to be compared with the original image 1. The terminal 300 transmits the original image 1 and the comparing target image 2, which has been generated, to the information processing apparatus 100. The information processing apparatus 100 performs difference detection by comparing the comparing target image 2 and the original image 1, which have been acquired from the terminal 300, and detects image information items of portions that have been edited by the user of the comparing target image 2, which has been generated, as difference information items 3 (3-*a* to 3-*c*).

Here, there is a case where the generation of the comparing target image 2 and the difference detection are performed several times by the terminal 300 and the information processing apparatus 100, respectively. In this case, for a user, it is desirable that a difference information item, which has been detected once and which will not be edited afterward, not be detected in the subsequent difference detections. Accordingly, the exemplary embodiment employs a configuration in which a difference information item that is selected by a user among difference information items that are detected by difference detection, which has been performed on the comparing target image 2, which has been generated, and the original image 1, is reflected in such a manner that the original image 1 that is stored in the memory 12 of the information processing apparatus 100 is updated.

Figure 3:
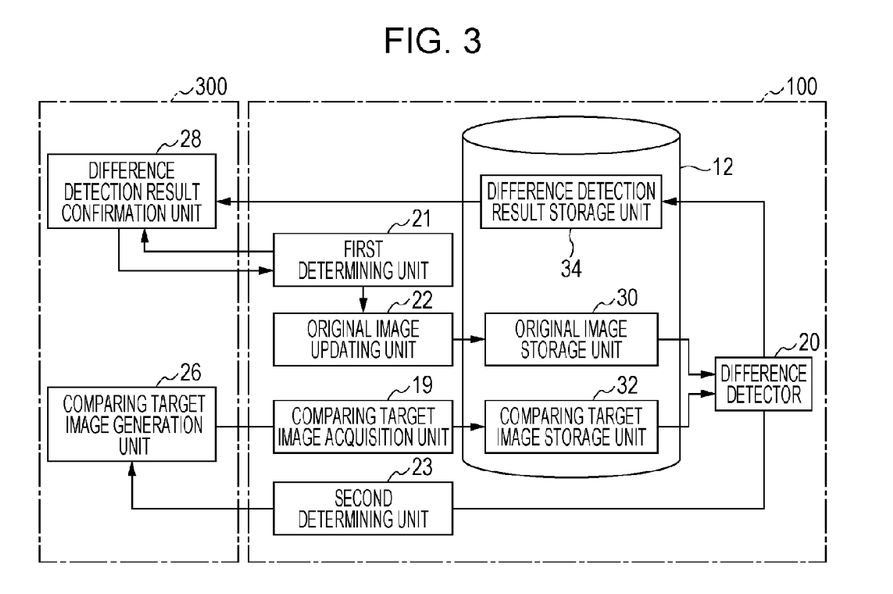
FIG. 3 is a block diagram illustrating examples of functions that are executed by the information processing apparatus 100 and a terminal 300 according to the exemplary embodiment.

FIG. 3 is a block diagram illustrating examples of functions that are executed by the information processing apparatus 100 and the terminal 300 according to the exemplary embodiment. As illustrated in FIG. 3, the information processing apparatus 100 includes a comparing target image acquisition unit 19, a difference detector 20, a first determination unit 21, an original image updating unit 22, a second determination unit 23, an original image storage unit 30, a comparing target image storage unit 32, and a difference detection result storage unit 34. Note that a function other than the functions illustrated in FIG. 3 may be realized in the information processing apparatus 100 according to the exemplary embodiment. These functions are realized by executing a program that is stored in the memory 12 so as to cause the controller 10 to operate. The program is supplied to the information processing apparatus 100 via, for example, a computer readable information storage medium such as an optical disc, a magnetic disk, a magnetic tape, a magneto-optical disk, or a flash memory or a communication unit such as the Internet.

The difference detector 20 performs difference detection by comparing the original image 1 that is stored in the original image storage unit 30 and the comparing target image 2 that is stored in the comparing target image storage unit 32. The difference detector 20 may detect a difference information item by performing, for example, difference processing in which the pixel value of the original image 1 is subtracted from the pixel value of the comparing target image 2 by using a difference detection technology, which is publicly known. Alternatively, the difference detector 20 may detect a difference information item by acquiring information items of each position in the comparing target image 2 and data items (bit data items each of which represents a pixel value) at all the positions and comparing the data items with data items of the original image 1 at corresponding positions. Note that the difference detector 20 stores difference detection results that include a difference information item, which has been detected and with which attributes such as the positional information item and the size information item thereof and a confirmation status are associated, in the difference detection result storage unit 34.

The first determination unit 21 determines whether or not a difference information item with which a confirmation status of "unconfirmed" is associated is present on the basis of difference detection results that have been confirmed by a difference detection result confirmation unit 28 of the terminal 300. The second determination unit 23 determines whether or not a difference information item with which a confirmation status of "unapproved" is associated is present.

The original image updating unit 22 generates a new original image 1 on the basis of the difference detection results, which have been confirmed by the difference detection result confirmation unit 28 of the terminal 300, and updates the original image 1 that is stored in the memory 12. More specifically, the original image updating unit 22 combines a difference information item, with which a confirmation status of "approved" is associated, with the original image 1, which is stored in the memory 12. The original image updating unit 22 combines the difference information item, with which the confirmation status of "approved" is associated, with the original image 1 at a corresponding position on the basis of the positional information item and the size information item of the difference information item. Alternatively, the original image updating unit 22 may generate the new original image 1 on the basis of the comparing target image 2. More specifically, the original image updating unit 22 replaces a difference information item with which a confirmation status of "unapproved" is associated in the comparing target image 2 with an image information item at a corresponding position in the original image 1 on the basis of the positional information item and the size information of the difference information item with which the confirmation status of "unapproved" is associated. As a result, the new original image 1 in which only a difference information item with which a confirmation status of "approved" is associated is reflected is generated.

When the first determination unit 21 determines that a difference information item with which a confirmation status of "unapproved" is associated is not present, the second determination unit 23 determines whether or not a difference information item is present by comparing the original image 1 that has been updated by the original image updating unit 22 and the comparing target image 2 that is stored in the comparing target image storage unit 32.

The memory 12 includes the original image storage unit 30, the comparing target image storage unit 32, and the difference detection result storage unit 34. First, the original image 1 that is received from the terminal 300 is stored in the original image storage unit 30, and after that, the original image 1, which has been stored, is updated by the original image updating unit 22. The comparing target image 2 that is acquired by the comparing target image acquisition unit 19 from a comparing target image generation unit 26 of the terminal 300 is stored in the comparing target image storage unit 32. Difference detection results that are detected by the difference detector 20 are stored in the difference detection result storage unit 34.

The terminal 300 includes the comparing target image generation unit 26 and the difference detection result confirmation unit 28. Note that a function other than the functions illustrated in FIG. 2 may be realized in the terminal 300 according to the exemplary embodiment. These functions are realized by executing a program that is stored in the memory so as to cause the controller to operate. The program is supplied to the terminal 300 via, for example, a computer readable information storage medium such as an optical disc, a magnetic disk, a magnetic tape, a magneto-optical disk, or a flash memory or a communication unit such as the Internet.

The comparing target image generation unit 26 edits, in accordance with an instruction from a user, the original image 1 that is stored in the memory of the terminal 300 or the comparing target image 2 that has been generated from the original image 1 and generates a new comparing target image 2. The user performs an editing operation such as rewriting components that are included in the original image 1 or the comparing target image 2, which has been generated from the original image 1, or adding a component in a blank area in the original image 1 or the comparing target image 2, which has been generated from the original image 1.

The difference detection result confirmation unit 28 associates, on the basis of difference detection results that are detected by the difference detector 20 of the information processing apparatus 100 and in accordance with an instruction from a user, a confirmation status (e.g., "approved", "unapproved", or the like) with each of the difference information items that have been detected. The confirmation status of "approved" is selected when a difference information item is desired to be confirmed, and the confirmation status of "unapproved" is selected when there is a possibility of the difference information item being edited at a later time. In addition, the difference detection result confirmation unit 28 associates a confirmation status of "unconfirmed" with a difference information item when neither of "approved" nor "unapproved" is selected for the difference information item.

Figure 4:
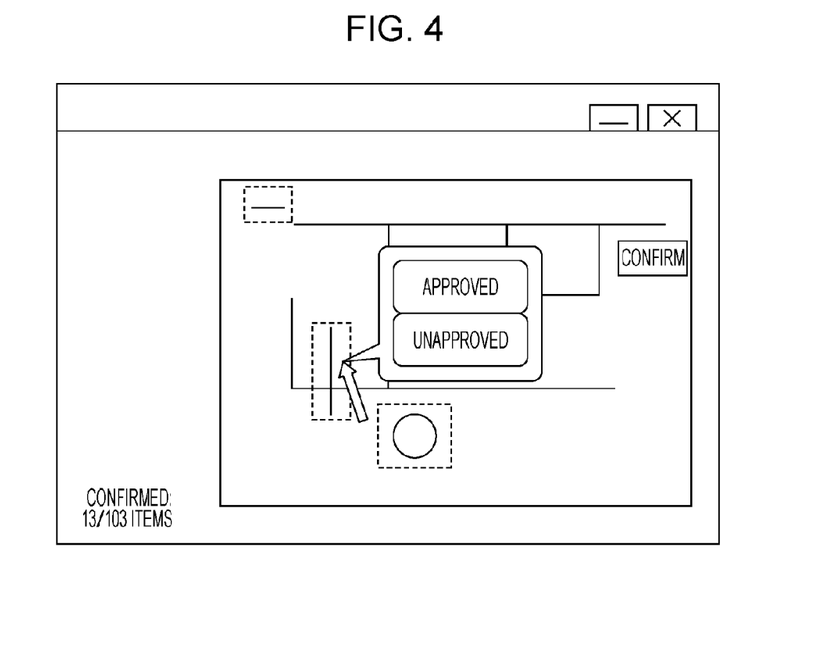
FIG. 4 is a diagram illustrating examples of difference detection results according to the exemplary embodiment.

FIG. 4 is a diagram illustrating an example of a confirmation screen for difference detection results. As illustrated in FIG. 4, difference information items are highlighted and displayed (here, the difference information items are surrounded by dashed lines) at corresponding positions in the comparing target image 2 on the basis of the positional information items and the size information items that are associated with the difference information items. When a user moves a pointer over one of the difference information items by operating a mouse or the like, a confirmation button (here, an approved/unapproved button) is displayed on the basis of a confirmation status that is associated with the difference information item. Regarding the approved/unapproved button, "approved" and "unapproved" are selectable by performing a click operation or the like. In the exemplary embodiment, the approved/unapproved button is provided, and this enables a user to select "approved" or "unapproved" as a confirmation result status. However, the exemplary embodiment is not limited to this example as long as a confirmation result is selectable by a user. A user selects "approved" when the user desires to confirm a difference information item and selects "unapproved" when correction or the like of the difference information item needs to be made. In the case where neither of "approved" nor "unapproved" is selected, "unconfirmed" is associated with the difference information item. In the case where there are multiple pages of difference detection results, "approved" may be selected on a page-by-page basis by providing a confirmation status for each page. A confirmation screen such as that illustrated in FIG. 4 may be displayed as a result of difference detection results being received by the terminal 300 from the information processing apparatus 100 and being reflected in the comparing target image 2 that is stored in the memory of the terminal 300 or may be displayed as a result of a confirmation image, which is obtained by reflecting difference detection results in the comparing target image 2, being generated in the information processing apparatus 100 and being acquired by the terminal 300.

Figure 5:
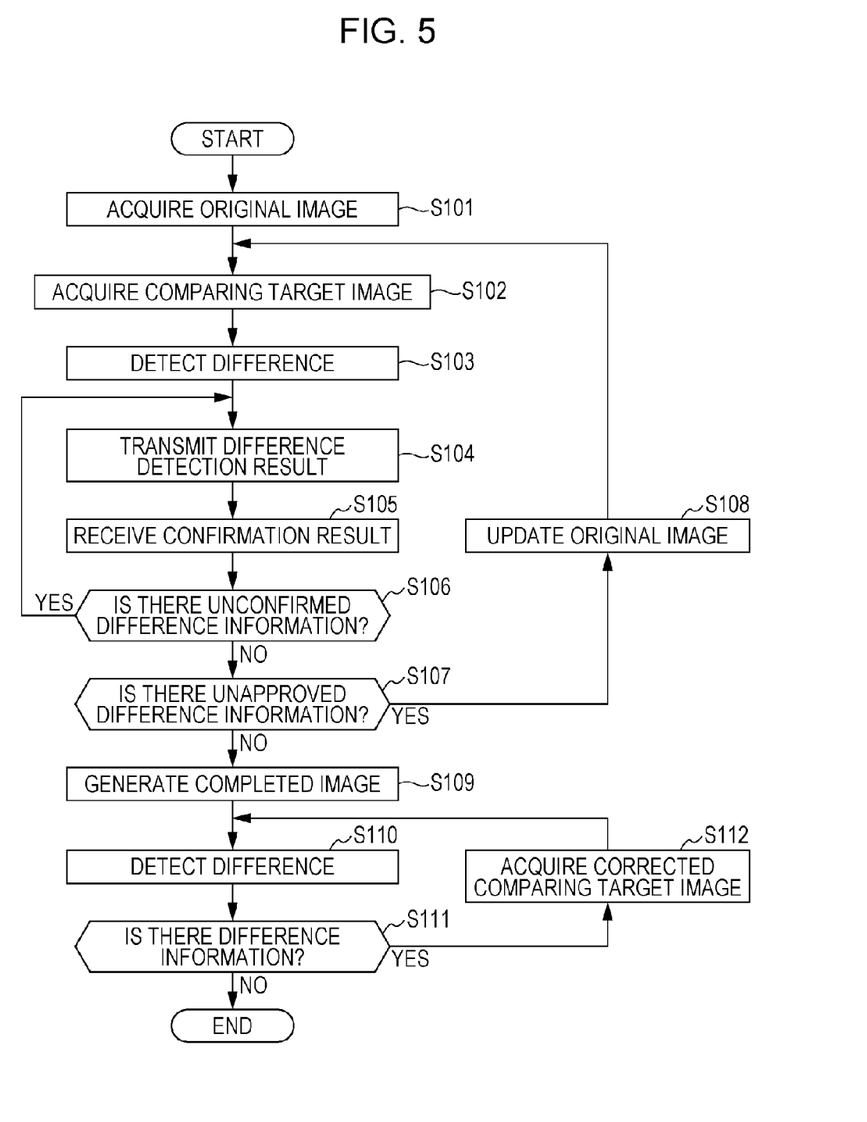
FIG. 5 is a flowchart illustrating an example of the flow of a difference detection process according to the exemplary embodiment.

An example of the flow of a difference detection process of the exemplary embodiment will now be described with reference to the flowchart of FIG. 5.

The comparing target image generation unit 26 of the terminal 300 generates the comparing target image 2 by editing the original image 1 that is stored in the memory of the terminal 300 and transmits the original image 1 and the comparing target image 2, which has been generated, to the information processing apparatus 100, so that a difference detection process that is to be executed by the information processing apparatus 100 starts. Note that the comparing target image 2, which has been generated by the comparing target image generation unit 26, is also stored in the memory of the terminal 300.

The information processing apparatus 100 acquires the original image 1 that is received from the terminal 300 and stores the original image 1 in the original image storage unit 30 of the memory 12 (S101). The comparing target image acquisition unit 19 of the information processing apparatus 100 acquires the comparing target image 2 that is received from the terminal 300 and stores the comparing target image 2 in the comparing target image storage unit 32 of the memory 12 (S102).

The difference detector 20 of the information processing apparatus 100 performs difference detection by comparing the comparing target image 2 that is stored in the comparing target image storage unit 32 and the original image 1 that is stored in the original image storage unit 30 (S103). Here, the difference detector 20 may perform the difference detection after removing an image information item with which a confirmation status of "approved" is associated in the original image 1 and a page with which a confirmation status of "approved" is associated from items that are to be subjected to the difference detection.

The difference detector 20 of the information processing apparatus 100 stores difference detection results in the difference detection result storage unit 34. The difference detection results include one or more difference information items that have been detected and with which attributes such as identification numbers that uniquely represent the original image 1 and the comparing target image 2 on each of which difference detection has been performed, the positional information items and the size information items of the difference information items, and confirmation statuses (here, "approved", "unapproved", and "unconfirmed") are associated. In addition, the difference detector 20 associates confirmation statuses (here, "approved", "unapproved", and "unconfirmed") with all the pages that form the comparing target image 2. The information processing apparatus 100 transmits the difference detection results, which have been stored in the difference detection result storage unit 34, to the terminal 300 (S104).

The difference detection result confirmation unit 28 of the terminal 300 acquires the difference detection results that are received from the information processing apparatus 100 and confirms each of the difference information items. Here, the difference detection result confirmation unit 28 selects, in accordance with an operation instruction from a user, one of the confirmation statuses of "approved", "unapproved", and "unconfirmed" that are associated with each of the difference information items and associates the selected confirmation status with the corresponding difference information item. In addition, the difference detection result confirmation unit 28 selects, in accordance with an operation instruction from the user, one of the confirmation statuses of "approved", "unapproved", and "unconfirmed" that are associated with each of the pages, which form the comparing target image 2, and associates the selected confirmation status with the corresponding page. Then, the terminal 300 transmits the difference detection results, which have been confirmed by the difference detection result confirmation unit 28, to the information processing apparatus 100.

The information processing apparatus 100 receives the difference detection results, which have been transmitted by the terminal 300 (S105). Then, the first determination unit 21 of the information processing apparatus 100 determines whether or not a confirmation status of "unconfirmed" is present in the confirmation statuses that are associated with the difference information items and the pages that are included in the difference detection results, which have been received from the terminal 300 (S106). In the case where it is determined in S106 that a confirmation status of "unconfirmed" is present (S106: Y), the above-described process of S104 and the subsequent processes are performed. The processes of S104 to S106 are repeated unless it is determined in S106 that a confirmation status of "unconfirmed" is not present.

In the case where it is determined in S106 that a confirmation status of "unconfirmed" is not present (S106: N), the first determination unit 21 of the information processing apparatus 100 determines whether or not a confirmation status of "unapproved" is present in the confirmation statuses, which are associated with the difference information items and the pages (S107).

In the case where it is determined in S107 that a confirmation status of "unapproved" is present (S107: Y), the original image updating unit 22 of the information processing apparatus 100 updates the original image 1 by combining a difference information item, with which a confirmation status of "approved" is associated, and a difference information item that is included in a page, with which a confirmation status of "approved" is associated, with the original image 1 that is stored in the original image storage unit 30 (S108). The original image 1, which has been updated, holds the identification numbers, the positional information items and the size information items of the difference information items, which have been combined with the original image 1, and the confirmation status of "approved" that are associated with the difference information items. In addition, the original image 1, which has been updated, holds the confirmation status of "approved" that is associated with the page.

Then, the information processing apparatus 100 performs the process of S102 and the subsequent processes. The comparing target image acquisition unit 19 of the information processing apparatus 100 acquires the new comparing target image 2 that has been newly generated by the comparing target image generation unit 26 of the terminal 300 and stores the new comparing target image 2 in the comparing target image storage unit 32 of the memory 12 (S102). Here, the comparing target image generation unit 26 may generate the new comparing target image 2 on the basis of the comparing target image 2, which has been stored in the terminal 300, or may generate the new comparing target image 2 on the basis of the original image 1, which has been stored in the original image storage unit 30 of the information processing apparatus 100 and which has been updated. The difference detector 20 of the information processing apparatus 100 performs difference detection by comparing the new comparing target image 2, which is stored in the comparing target image storage unit 32, and the original image 1, which is stored in the original image storage unit 30 and which has been updated in S108 (S103). When the difference detector 20 of the information processing apparatus 100 performs the difference detection in S103, the difference detector 20 may perform the difference detection after sorting out an image information item that is to be removed from items that are to be subjected to the difference detection by referring to the confirmation status of "approved" that is held by the original image 1 in S105. The information processing apparatus 100 repeats the processes of S102 to S108 unless it is determined in S107 that a confirmation status of "unapproved" is not present.

In the case where it is determined in S107 that a confirmation status of "unapproved" is not present (S107: N), the original image updating unit 22 of the information processing apparatus 100 updates the original image 1, which is stored in the original image storage unit 30 by combining a difference information item, with which a confirmation status of "approved" is associated, and a difference information item that is included in a page, with which a confirmation status of "approved" is associated, with the original image 1 that is stored in the original image storage unit 30 (S109). The original image 1, which has been updated by the original image updating unit 22 in S109, is a final completed image in which all of the difference information items that have been detected and that have been approved by a user are combined.

The difference detector 20 of the information processing apparatus 100 performs difference detection by comparing the original image 1, which has been updated by the original image updating unit 22 in S109, (hereinafter referred to as "a completed image") and the comparing target image 2 that is stored in the comparing target image storage unit 32 (S110). Here, it is confirmed that the completed image is identical to the comparing target image 2 that is acquired by the information processing apparatus 100 from the terminal 300 in S102. In other words, it is confirmed that the difference information item with which a confirmation status of "approved" is associated is not modified, deleted, or the like during the period when the comparing target image generation unit 26 of the terminal 300 is repeating the generation of the comparing target image 2.

The second determination unit 23 of the information processing apparatus 100 determines whether or not a difference information item that is detected through the difference detection of S110 is present (S111). In the case where it is determined in S111 that the difference information item is present, the information processing apparatus 100 transmits the difference information item, which has been detected, to the terminal 300. The comparing target image generation unit 26 of the terminal 300 generates a corrected comparing target image 2 in which the difference information item, which has been detected, has been corrected on the basis of the difference information item, which has been received, and transmits the corrected comparing target image 2 to the information processing apparatus 100. Then, the comparing target image acquisition unit 19 of the information processing apparatus 100 acquires the corrected comparing target image 2 and stores the corrected comparing target image 2 in the comparing target image storage unit 32 of the memory 12 (S112). The difference detector 20 of the information processing apparatus 100 performs difference detection by comparing the corrected comparing target image 2, which has been stored in the comparing target image storage unit 32, and the completed image that is stored in the original image storage unit 30 (S110). The information processing apparatus 100 repeats the processes of S110 to S112 unless it is determined in S111 that a difference information item that is detected through the difference detection of S110 is not present.

In the case where it is determined in S111 that a difference information item that is detected through the difference detection of S110 is not present, the information processing apparatus 100 ends the difference detection process.

Note that the present invention is not limited to the above-described exemplary embodiment.

Although the case where the information processing apparatus 100 and the terminal 300 are different apparatuses has been described in the exemplary embodiment, the terminal 300 may include the functions that are realized by the information processing apparatus 100.

Although, in the exemplary embodiment, the comparing target image generation unit 26 of the terminal 300 generates the new comparing target image 2 on the basis of the original image 1 that is stored in the memory of the terminal 300 or the comparing target image 2, the comparing target image generation unit 26 of the terminal 300 may acquire the original image 1, which has been updated by the original image updating unit 22 of the information processing apparatus 100, and generate the new comparing target image 2 on the basis of the original image 1, which has been updated.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to execute:
a comparing target image acquisition unit that acquires a comparing target image that is to be compared with an original image;
a difference detection unit that detects one or more difference information items by comparing the original image and the comparing target image;
a display controlling unit that controls displaying a screen after the one or more difference information items are detected by the difference detection unit,
wherein the screen enables a user to select at least one difference information item, from among the detected one or more difference information items, and
wherein the screen enables the user to indicate whether the selected at least one difference information item is approved or unapproved; and
an original image updating unit configured to update the original image by, in response to the user indicating that the selected at least one difference information item is approved, combining the selected at least one difference information item into the original image, and, in response to the user indicating that the selected at least one difference information item is unapproved, refraining from combining the selected at least one difference information item into the original image.

2. The information processing apparatus according to claim 1, wherein the original image updating unit updates the original image by replacing a difference information item in the comparing target image that the user has indicated is unapproved, with an image information item in the original image at a position that corresponds to a position of the difference information item in the comparing target image that the user has indicated is unapproved.

3. The information processing apparatus according to claim 2, wherein the processor is further configured to execute:
a first determination unit that determines whether or not a difference information item, which the user has indicated is unapproved, is present among the detected one or more difference information items,
wherein in response to the first determination unit determining that the difference information item, which the user has indicated is unapproved, is present among the detected one or more difference information items, the original image updating unit updates the original image by combining at least one difference information item, which the user has indicated is approved, from among the detected one or more difference information items, into the original image, but refraining from combining the difference information item, which the user has indicated is unapproved, into the original image.

4. The information processing apparatus according to claim 2, wherein the processor is further configured to execute:
a first determination unit that determines whether or not a difference information item, which the user has indicated is unapproved, is present among the detected one or more difference information items; and
a second determination unit that determines, in response to the first determination unit determining that the difference information item, which the user has indicated is unapproved, is not present, whether or not one or more difference information items that are detected by comparing the original image that is updated by the original image updating unit and the comparing target image are present.

5. The information processing apparatus according to claim 1, wherein the processor is further configured to execute:
a first determination unit that determines whether or not a difference information item, which the user has indicated is unapproved, is present among the detected one or more difference information items,
wherein, in response to the first determination unit determining that the difference information item, which the user has indicated is unapproved, is present among the detected one or more difference information items, the original image updating unit updates the original image by combining at least one difference information item, which the user has indicated is approved, from among the detected one or more difference information items, into the original image, but refraining from combining the difference information item, which the user has indicated is unapproved, into the original image.

6. The information processing apparatus according to claim 1, wherein the processor is further configured to execute:
a first determination unit that determines whether or not a difference information item, which the user has indicated is unapproved, is present among the detected one or more difference information items; and
a second determination unit that determines, in response to the first determination unit determining that the difference information item, which the user has indicated is unapproved, is not present, whether or not one or more difference information items that are detected by comparing the original image that is updated by the original image updating unit and the comparing target image are present.

7. The information processing apparatus according to claim 1,
wherein the difference detection unit detects a plurality of difference information items by comparing the original image and the comparing target image, and
wherein the screen enables the user to select at least one of the detected plurality of difference information items.

8. The information processing apparatus according to claim 1, wherein the processor is further configured to determine whether or not a difference information item is present by comparing the original image that has been updated by the original image updating unit and the comparing target image.

9. An information processing method comprising:
acquiring a comparing target image that is to be compared with an original image;

detecting, by a difference detection unit, one or more difference information items by comparing the original image and the comparing target image;

controlling display, using a display controlling unit, of a screen after the one or more difference information items are detected by the difference detection unit,    wherein the screen enables a user to select at least one difference information item, from among the detected one or more difference information items, and    wherein the screen enables the user to indicate whether the selected at least one difference information item is approved or unapproved; and updating the original image by, in response to the user indicating that the selected at least one difference information item is approved, combining the selected at least one difference information item into the original image, and, in response to the user indicating that the selected at least one difference information item is unapproved, refraining from combining the selected at least one difference information item into the original image.

10. A non-transitory computer readable medium storing a program causing a computer to execute a process, the process comprising:

acquiring a comparing target image that is to be compared with an original image;

detecting, by a difference detection unit, one or more difference information items by comparing the original image and the comparing target image;

controlling display, using a display controlling unit, of a screen after the one or more difference information items are detected by the difference detection unit,    wherein the screen enables a user to select at least one difference information item, from among the detected one or more difference information items, and    wherein the screen enables the user to indicate whether the selected at least one difference information item is approved or unapproved; and updating the original image by, in response to the user indicating that the selected at least one difference information item is approved, combining the selected at least one difference information item into the original image, and ,in response to the user indicating that the selected at least one difference information item is unapproved, refraining from combining the selected at least one difference information item into the original image.

\* \* \* \* \*